(12) United States Patent
Camilleri

(10) Patent No.: US 8,935,876 B2
(45) Date of Patent: Jan. 20, 2015

(54) FISHING LURES

(76) Inventor: Clayton Camilleri, Kirkop (MT)

( * ) Notice: Subject to any disclaimer, the term of this patent is extended or adjusted under 35 U.S.C. 154(b) by 416 days.

(21) Appl. No.: 13/319,367

(22) PCT Filed: May 5, 2010

(86) PCT No.: PCT/EP2010/056098
§ 371 (c)(1),
(2), (4) Date: Nov. 8, 2011

(87) PCT Pub. No.: WO2010/128078
PCT Pub. Date: Nov. 11, 2010

(65) Prior Publication Data
US 2012/0055065 A1    Mar. 8, 2012

(30) Foreign Application Priority Data
May 8, 2009 (MT) ............................................. 4255

(51) Int. Cl.
*A01K 83/06* (2006.01)
(52) U.S. Cl.
CPC ...................................... *A01K 83/06* (2013.01)
USPC ......................................................... 43/44.2
(58) Field of Classification Search
CPC ..................................................... A01K 83/06
USPC ................................. 43/44.2, 44.4, 44.6, 44.8
See application file for complete search history.

(56) References Cited

U.S. PATENT DOCUMENTS

| 1,863,544 | A | * | 6/1932 | Prouse | 43/44.8 |
| 2,017,333 | A | * | 10/1935 | Zuck | 43/44.6 |
| 2,476,126 | A | * | 7/1949 | Weiss | 43/44.2 |
| 2,977,710 | A | * | 4/1961 | Stambaugh | 43/44.2 |
| 3,197,911 | A | * | 8/1965 | Rolfsness et al. | 43/44.2 |
| 3,839,814 | A | * | 10/1974 | Sykora | 43/44.2 |
| 8,024,887 | B2 | * | 9/2011 | Milanowski | 43/42.2 |

FOREIGN PATENT DOCUMENTS

| CH | 675665 | A5 | * | 10/1990 | ............ A01K 83/06 |
| FR | 955655 | A | * | 1/1950 | ............ A01K 83/06 |
| GB | 745508 | A | * | 2/1956 | ............ A01K 83/06 |

* cited by examiner

*Primary Examiner* — Darren W Ark
*Assistant Examiner* — Danielle Clerkley
(74) *Attorney, Agent, or Firm* — Thomas | Horstemeyer, LLP

(57) ABSTRACT

A fishing lure for receiving a bait fish comprises a mounting body and a fixing means (3) for fixing a bait fish to the mounting body. The mounting body comprising a support rod (5) for inserting into the mouth of a bait fish to support the mounted bait fish and a retaining means (4, 7) disposed on the support rod (5) for abutting a head portion of the bait fish. The mounting body is adapted not to conceal, in use, eyes of a bait fish mounted on the mounting body.

18 Claims, 3 Drawing Sheets

Figure 1 - top view
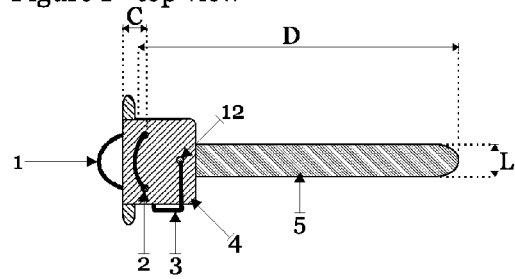
Figure 3 - side view
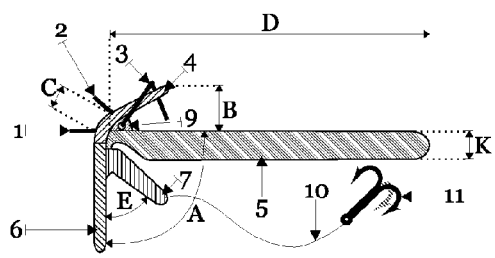
Figure 2 - back view
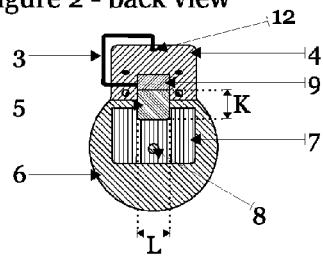
Figure 4 - front view
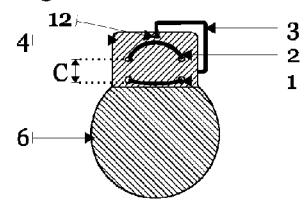
Figure 5
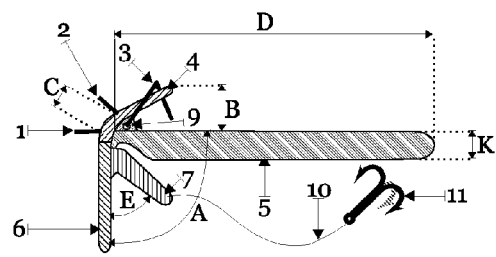
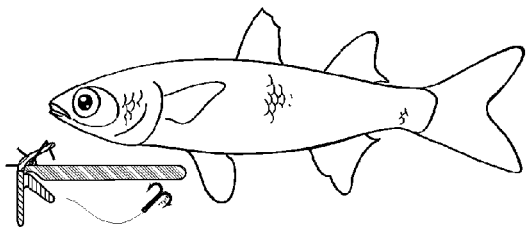
Figure 6
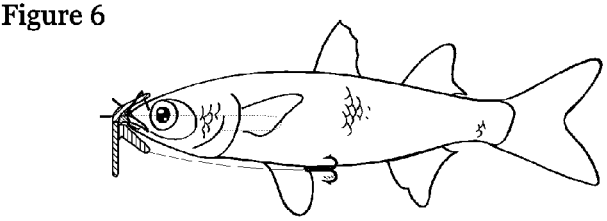

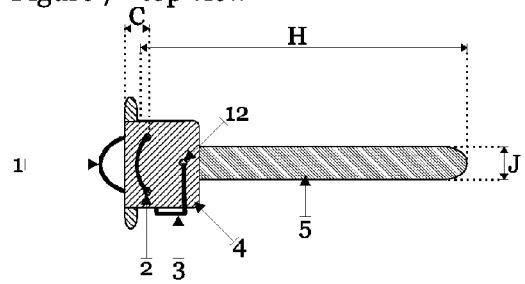
Figure 7 - top view
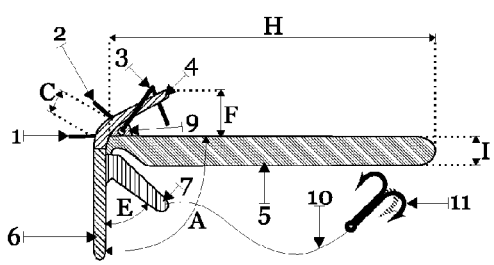
Figure 9 - side view
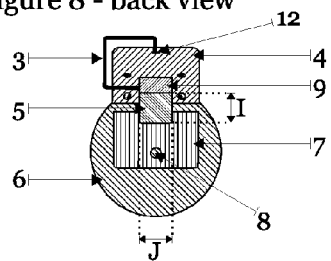
Figure 8 - back view
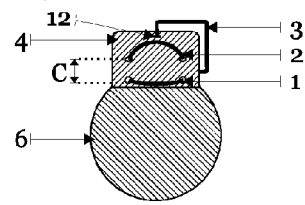
Figure 10 - front view
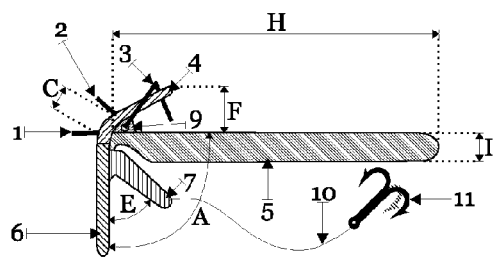
Figure 11
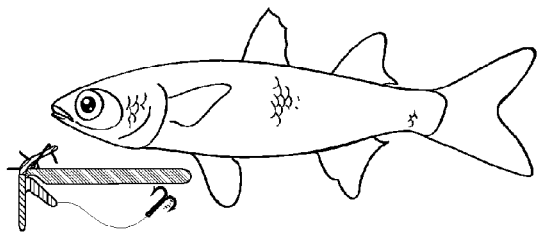
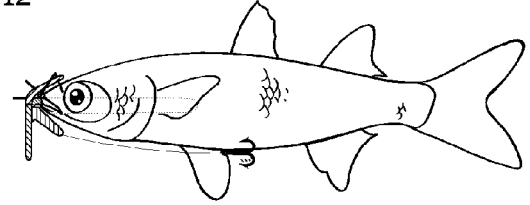
Figure 12

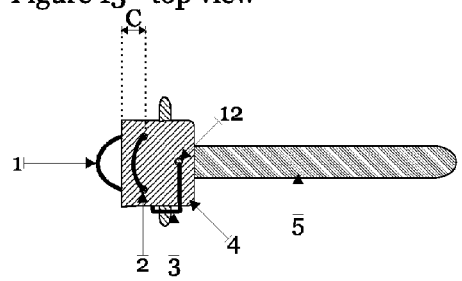
Figure 13 - top view
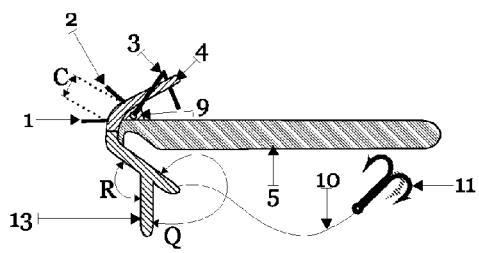
Figure 15 - side view
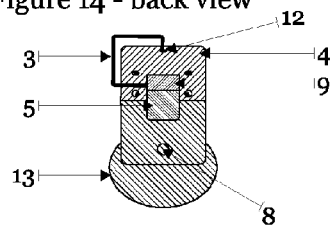
Figure 14 - back view
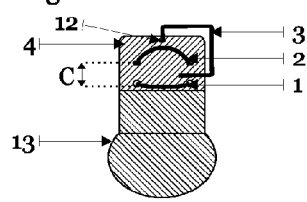
Figure 16 - front view
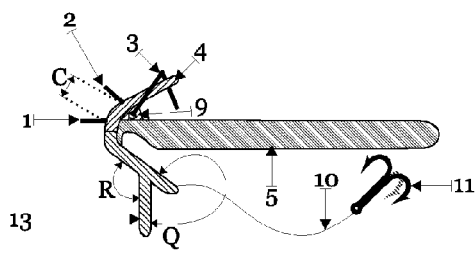
Figure 17
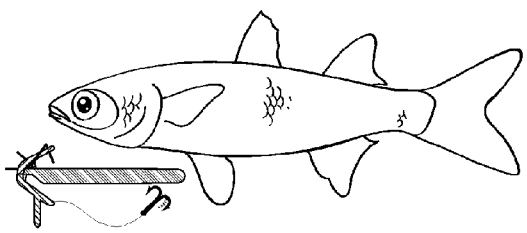
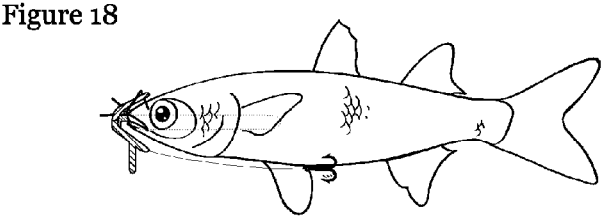
Figure 18

FISHING LURES

CROSS-REFERENCE TO RELATED APPLICATION

This application is a co-pending application which claims priority to PCT Application No. PCT/EP2010/056098, filed May 5, 2010, entitled "Fishing Lures" herein incorporated by reference in its entirety. This application also claims priority to, and the benefit of, Maltese application no. 4255, filed May 8, 2009 herein incorporated by reference in its entirety.

FIELD OF INVENTION

The invention relates to a fishing lure and to a method of preparing bait using a fishing lure. In aspects, the invention relates to fishing lures suitable for mounting a dead bait fish for use in trolling, and to methods of constructing a baited trolling rig.

BACKGROUND OF INVENTION

Artificial lures are commonly used to catch fish, particularly in sport and recreational fishing. In order to catch fish which themselves prey upon other fish, it is desirable to use a lure which includes an appropriate bait fish. While live bait can be used for this purpose, this creates numerous practical difficulties: it is necessary to obtain live bait, mount it appropriately, and check regularly that it is still alive. In addition, live bait can only be trolled effectively at relatively low speeds.

Many difficulties in using live bait can be solved by using dead bait, but new difficulties arise. To be an effective lure, the dead bait must sufficiently resemble live bait in appearance and disposition for it to be recognised as desirable prey by a predator fish. While a number of fishing lures used for mounting dead bait have been developed, these are generally either complex to make, difficult to use, insufficiently lifelike or have some combination of these faults. Examples of prior art fishing lures for dead bait trolling are found in U.S. Pat. Nos. 2,518,593, 3,645,031, 4,067,135, 4,791,751, 5,177,895, 5,893,232, 6,658,785 and 7,257,923.

It is therefore desirable to provide a fishing lure for mounting dead bait for trolling which addresses these shortcomings of the prior art.

SUMMARY OF INVENTION

Accordingly, in one aspect, the invention provides a fishing lure for receiving a bait fish, the fishing lure comprising a mounting body and a fixing means for fixing a bait fish to the mounting body, the mounting body comprising a support rod for inserting into the mouth of a bait fish to support the mounted bait fish and a retaining means disposed on the rod for abutting a head portion of the bait fish, wherein the mounting body is adapted not to conceal, in use, eyes of a bait fish mounted on the mounting body.

This arrangement allows the bait fish to be received and supported effectively on a simple and robust structure, but in such a way that it preserves the appearance of a live fish to predators.

In an embodiment, the retaining means comprises at least one surface adapted to abut at least a part of a head portion of a bait fish. This at least one surface may be substantially flat.

The retaining means may comprise a first surface of a first, upper part for abutting an upper head portion of a bait fish and a second surface of a second, lower part for abutting a lower head portion of a bait fish. The upper part may comprise an upper bar adapted to resemble an upper profile of a head of a bait fish, and the lower part may comprise a lower bar adapted to resemble the lower profile of a head of a bait fish. This arrangement enables the fishing lure to preserve the overall appearance of the fish to any predator. The lower part may further comprise a bill to create a reciprocating lateral motion in use when a bait fish is mounted on the fishing lure and the mounted bait fish is pulled through the water. This provides the dynamic, as well as the static, appearance of a live fish to any predator.

The support rod, the upper part and the lower part may be fixed together in an intersection region to form the mounting body. This can provide a structure that is simple to produce and which has good structural strength. The mounting body may be formed as a unitary component, such as a moulded component. It may be made substantially of metal, a suitable metal being brass. The mounting body may have one or more eyelets for attaching a fishing line thereto. One or more of these eyelets may be provided in the intersection region. There may be a plurality of eyelets located on or adjacent to the upper part, such that one of said eyelets is located further from the lower part than another of said eyelets.

In embodiments, the lower bar may act as a counter balance weight, for example providing 15-20% of the weight of the fishing lure.

The fishing lure may further comprise a line and a hook, wherein the line is attached to the lower bar, whereby the hook is adapted to be hooked on to a bait fish.

In embodiments, the support rod is weighted. It may provide 45-50% of the weight of the fishing lure. The support rod may be adapted to extend beyond the upper part and the lower part of the retaining means along a length of a bait fish, for example extending to approximately half the length of a preferred bait fish. With a support rod of this kind, the fishing lure gives good support to the bait fish, preserving life, without affecting its lifelike appearance.

An angle between the first surface and the support rod may be substantially equal to an angle between the support rod and the second surface. The support rod may be provided with a recess adjacent to the retaining means, whereby the recess is adapted to enable the jaw of a bait fish mounted on the support rod to close. A depth of the recess may be substantially half a width of the support rod.

In embodiments, the bill and the lower bar extend to the intersection region. In other embodiments, the bill is connected to the lower bar along a length of the lower bar from the intersection region.

Generally, the bill has a substantially elliptical shape, truncated at a chord. This substantially elliptical shape may in embodiments be a substantially circular shape.

In embodiments, the bill is disposed, in use, at substantially 90 degrees to the support rod. Generally, an angle between the lower bar and the bill is adapted to ensure that in use a bait fish mounted on the fishing lure is disposed in a stable and upright position. An angle between the lower bar and the bill may be substantially 60 degrees.

The fixing means may comprise a locking pin rotatably mounted on the fishing lure and a penetrating member to penetrate the skull of a bait fish. The locking pin may be mounted substantially at the intersection point. The upper part or the lower part may be provided with an aperture, and wherein the penetrating member is adapted to pass through the aperture when fixing a bait fish to the mounting body. The locking pin may be formed of wire. This fixing means is straightforward, easy to manufacture, and effective to cooperate with other parts of the fishing lure to retain a bait fish effectively.

In a further aspect, the invention provides a method of mounting a bait fish for trolling using a fishing lure comprising a mounting body having a support rod and a retaining means, comprising inserting the support rod into the mouth of a bait fish and pushing the support rod into the bait fish until a head of the bait fish abuts a retaining means but such that eyes of the bait fish are exposed, and fixing the bait fish to the mounting body with fixing means.

BRIEF DESCRIPTION OF DRAWINGS

Specific embodiments of the invention will now be described, by way of example, with reference to the accompanying drawings, of which:

FIG. 1 shows a plan view of a first embodiment of a fishing lure;

FIG. 2 shows a rear view of the fishing lure of FIG. 1;

FIG. 3 shows a side elevation of the fishing lure of FIG. 1;

FIG. 4 shows a front view of the fishing lure of FIG. 1;

FIG. 5 shows a side view of the fishing lure of FIG. 1 in relation to a bait fish;

FIG. 6 shows a bait fish mounted on the fishing lure of FIG. 1;

FIG. 7 shows a plan view of a second embodiment of a fishing lure;

FIG. 8 shows a rear view of the fishing lure of FIG. 7;

FIG. 9 shows a side elevation of the fishing lure of FIG. 7;

FIG. 10 shows a front view of the fishing lure of FIG. 7;

FIG. 11 shows a side view of the fishing lure of FIG. 7 in relation to a bait fish;

FIG. 12 shows a bait fish mounted on the fishing lure of FIG. 7;

FIG. 13 shows a plan view of a first embodiment of a fishing lure;

FIG. 14 shows a rear view of the fishing lure of FIG. 13;

FIG. 15 shows a side elevation of the fishing lure of FIG. 13;

FIG. 16 shows a front view of the fishing lure of FIG. 13;

FIG. 17 shows a side view of the fishing lure of FIG. 13 in relation to a bait fish; and FIG. 18 shows a bait fish mounted on the fishing lure of FIG. 13.

DESCRIPTION OF SPECIFIC EMBODIMENTS

A first embodiment is described with reference to FIGS. 1 to 6.

FIGS. 1 to 4 show plan, rear elevation, side elevation and front elevations respectively of the first embodiment of a fishing lure. The fishing lure has a mounting body which comprises a first, upper, bar 4, a second, lower, bar 7, a rod 5 and a bill 6. The fishing lure is provided with a first eyelet 1 and a second eyelet 2, either of which may be attached to a fishing line for trolling the fishing lure from a boat. A hook 11 is mounted on a length of fishing line 10 attached to the lower bar 7 through an aperture 8. A fixing means in the form of a locking pin 3 is provided for fixing a dead bait fish on to the mounting body. The locking pin is rotatably mounted 9 on the mounting body to pass through an aperture 12 in the upper plate 4.

The elements of the mounting body are fixed together in use. In the arrangement shown, upper bar 4, lower bar 7, rod 5 and bill 6 are all moulded components. These are preferably formed of a metal suitable for use in a fishing lure, such as brass. The separate components may be permanently or detachably fixed together, or some or all of the components may be formed in a single moulding.

The eyelets 1, 2 and the locking pin 3 may advantageously be formed of a metal wire.

The individual components of the first embodiment of the fishing lure will now be described in more detail.

The largest component of the mounting body is the rod 5. As can be seen from FIG. 5, this is inserted through the mouth of a bait fish, such as a minnow. The rod is weighted, and provides the main part of the weight of the mounting body. The length of the rod is also a significant proportion of the length of an appropriate bait fish. The rod 5 thus provides stability to the mounted bait fish during trolling.

The fishing lure shown in FIGS. 1 to 6 is dimensioned to be suitable for use with a bait fish such as a minnow of approximately 11-15 cm in length—a set of dimensions are given here for a version of this first embodiment referred to as "Easy Rigger 1". The length of the rod 5 may advantageously be slightly less than half the length of an appropriate bait fish—in this case, for example, a length D of the rod 5 may be 5 cm for use with bait fish of approximately 11 cm in length. The rod 5 would still be effective if this length was increased or decreased by 1.5 cm (and so would still be effective if slightly greater than half the length of the bait fish, for example). As indicated above, the rod 5 should also provide a significant part of the weight of the overall fishing lure—a suitable weight here would be 14 g, with the rod forming 45-50% of the total weight of the fishing lure. The rod shown in FIGS. 1 to 6 has a substantially square cross-section (though this is not of particular significance—it would function as well with a circular cross-section) with height and width K and L of approximately 6 mm, which is suitable to mount a minnow of approximately 11 cm as a bait fish. If the rod 5 is made of brass and of these dimensions, it will have approximately this weight.

The rod 5 is rounded at its free end for ease of insertion into the bait fish. At its fixed end, the rod 5 abuts a rear face of the upper bar 4 and a rear face of the bill 6, the end of the rod 5 lying over and adjacent to a fixed end of the lower bar 7. In the vicinity of its fixed end, the lower part of the rod 5 is recessed. This recess allows the bait fish to be advanced up to the intersection region where the fixed ends of the mounting body components meet, and also allows the mouth of the bait fish to be substantially closed when the bait fish is fully mounted on to the mounting body. This helps to make the appearance and disposition of the bait fish more lifelike in use. The depth of the recess may be substantially half of the overall depth of the rod 5.

The upper bar 4 is mainly in the form of a plate disposed above the rod 5 and at an angle (for a typical bait fish, 30 degrees is suitable) to it such that the upper part of the bait fish head, in use, can be pushed up against the rear face of the upper bar 4 along most of its length. The upper bar bends round in the intersection region to be disposed substantially vertically at its fixed end, with the fixed end of the rod 5 abutting the rear face of the upper bar at this point. The fixed end of the upper bar 4 abuts the fixed end of the bill 6, as will be discussed further below.

A first eyelet 1 and a second eyelet 2 are disposed on the front face of the upper bar 4. These eyelets 1, 2 are wire loops embedded into the upper bar, the fixture needing sufficient structural strength to support a fishing line for trolling the bait fish mounted on the fishing lure. The first eyelet 1 is located in the intersection region, roughly level with the top of the rod 5. This is suitable for slow trolling (approximately 2 to 4 knots). The second eyelet 2 is mounted further up the upper bar 5, for example at about 5 mm from the first eyelet 1. This second eyelet 2 is suitable for faster trolling (approximately 5 knots) and for use with bigger and heavier fish. The different line mounting choices cooperate with the overall dimensions and weight distribution of the fishing lure to achieve effective disposition of the bait fish in trolling.

The upper bar 4 is also provided with an aperture 12 near its free end for use as part of a fixing means. The distance B between the free end of the upper bar 4 and the upper face of the rod 5 is approximately 7 mm in the set of dimensions described for this embodiment. The aperture 12 cooperates with a locking pin 3. The locking pin 3 is formed from stiff wire (the same material may be used as for the eyelets 1, 2) and is mounted in a cavity 9 formed in a solid infill between the rod 5 and the upper plate 4. The locking pin is bent to pass outside the upper plate 4 to allow it to be rotated in and out of the aperture 12, which may be typically up to about 2 mm in diameter. It is desirable for the locking pin 3 to be a sufficiently close fit in the aperture 12 that it does not emerge from it freely, and it is desirable for the locking pin 3 when fully inserted into the aperture to extend almost as far as the rod 5. In use, the bait fish is pushed so that its mouth is adjacent to the intersection region and registers over the recess of the rod 5, and the locking pin is then forced into the skull of the bait fish to hold it in position on the mounting body.

The bill 6 extends downward from the fixed end of the upper plate 4, such that the angle A between the bill 6 and the rod 5 is approximately 90 degrees. The bill 6 forms with its front face the greater part of a circle, terminated at its fixed end at a chord where the fixed end of the bill abuts the fixed end of the upper plate. The diameter of the bill 6 in this design may be 2 cm This shape is chosen to deflect water during trolling in such a way as to create a lateral wobble on the lure head to result in a natural wiggle in the tail of the bait fish when it is trolled through the water. This improves the effectiveness of the fishing lure, as it creates a better approximation to the movement of a live fish.

The lower bar 7 serves as a counter balance weight to position the mounted bait fish correctly in the water during trolling. The lower bar preferably provides 15-20% of the weight of the fishing lure, leaving 30-40% to be provided by the upper bar and the bill. The fixed end of the lower bar 7 is connected to the rear face of the bill in the intersection region. The lower bar then bends down at an angle E of approximately 60 degrees to the bill 60 and extends as a substantially flat plate towards its free end. The overall length of the lower bar 7 in this arrangement may be 25-30% of the length D of the rod 5. With the lower bar extending at this angle, the bait fish will lie in a natural position (substantially horizontal), but with a slight forward lean during trolling which will enable the bill 6 to impart more drag and hence also provide a more lifelike motion.

The lower bar 7 performs a further function, complementing a function of the upper bar 4. While the rear face of the upper bar 4 matches the profile of an upper head part of a preferred type of bait fish, the rear face of the lower bar 7 similarly matches the profile of a lower head part of such a bait fish. This enables the fishing lure as a whole to provide a profile very similar to that of the bait fish itself (see FIGS. 4 and 6), while securing the bait fish effectively in position and moving the bait fish in a naturalistic manner. Moreover, as can be seen from FIG. 6, this mounting arrangement leaves the eyes of the bait fish fully exposed. As the eyes are a part of the bait fish that will be particularly important to its recognition by a predator fish, this aspect of the mounting of the bait fish is a significant benefit of this system.

In use, a lure hook 11 is attached by a short length of flexible line 10—such as nylon or wire fishing line—to an eyelet 8 formed at the free end of the lower bar 7. The lure hook may then be snagged on to the lower part of a bait fish, as shown in FIG. 6, so that it will engage a predator fish which takes the bait.

FIGS. 7 to 12 show a second embodiment of a fishing lure. The second embodiment closely resembles the first embodiment—FIGS. 7 to 12 essentially correspond to FIGS. 1 to 6 respectively, and the same reference numerals are used—but the second embodiment is dimensioned for larger bait fish. Dimensions for a version of this second embodiment referred to as "Easy Rigger 2" are provided below. This embodiment is sized for bait fish of 15-20 cm.

The angles between upper bar 4 and rod 5, between rod 5 and bill 6, and between bill 6 and lower bar 7, can remain unchanged from those in the first embodiment. However, the other dimensions, and the component weights, will generally increase, though proportions may remain similar. In this embodiment, the length H of the rod 5 is approximately 60 mm and the weight of the rod is approximately 22.5 g. The height I and width J of the rod 5 are approximately 9 mm in this embodiment. Further exemplary increased dimensions are the distance F between the rod 5 and the upper bar 4 is approximately 9 mm, as opposed to 7 mm in the first embodiment, and the diameter of the bill 6 is 2.5 cm.

A third embodiment of a fishing lure is shown in FIGS. 13 to 18. These Figures again generally resemble FIGS. 1 to 6 respectively, and the reference numerals again correspond to those used in these earlier Figures.

In this arrangement, the arrangement of the bill and the lower bar has been somewhat changed, while the other components of the fishing lure (such as the rod 5 and the upper bar 4) are unaffected, save only in their connection to the bill or the lower bar in the intersection region. In this arrangement the bill is displaced some distance along the lower bar, and it is strictly the lower bar, rather than the bill, which abuts the fixed end of the upper bar 4. The lower bar and the bill can in this arrangement be considered as a composite lower element 13 in FIGS. 13 to 18.

The lower bar extends vertically in the intersection region to abut at its fixed end the fixed end of the upper bar 4. As it extends away from the intersection region, the lower bar is bent at an angle to the rod 5 in the same way as for the first and second embodiments. Between the rear faces of the upper bar 4 and the lower bar—the parts of the fishing lure between which the bait fish is mounted—there is no significant difference between the third embodiment and the first and second embodiments. The bill is formed part way along the length of the lower bar, extending downwardly from the front face of the lower bar—this may be, for example, substantially 85% of the distance along the lower bar from the intersection region. The bill has the same function as for the first two embodiments—the angles R and Q between bill and lower bar are substantially 120 degrees and 240 degrees respectively. With this displaced location, the shape of the bill may advantageously be modified—as can be seen from FIG. 16, the bill is broadly elliptical rather than circular in this arrangement, though as before the bill does not form a full ellipse but is truncated at a chord, which forms the connection to the main part of composite lower element 6.

As the person skilled in the art, the embodiments described here are exemplary only, and modifications and variations to these embodiments and also new embodiments may be devised while remaining within the spirit and scope of the invention.

The invention claimed is:

1. A fishing lure for receiving a bait fish, the fishing lure comprising a mounting body and a fixing hook for fixing a bait fish to the mounting body, the mounting body comprising:
   a weighted support rod for inserting into the mouth of a bait fish to support a mounted bait fish;
   an upper bar, the upper bar having a first surface adapted to abut an upper head portion of the mounted bait fish; and
   a weighted lower bar, the lower bar having a second surface adapted to abut a lower head portion of the mounted bait fish, wherein the lower bar acts as a counterbalance to the support rod; and
   a bill adapted to induce a reciprocating lateral motion in use when a bait when a bait fish is mounted on the fishing lure and the mounted bait fish is pulled through the water, wherein the bill and the lower bar are fixed together;
   wherein the support rod is provided with a recess adapted to enable a jaw of a bait fish mounted on the support rod to close with the first surface and the second surface abutting the mounted bait fish.

2. A fishing lure as claimed in claim 1, wherein the bill and the lower bar are fixed together in an intersection region where the support rod, the upper bar and the lower bar are fixed together.

3. A fishing lure as claimed in claim 1, wherein the bill and the lower bar are fixed together along the length of the lower bar, separated from an intersection region where the support rod, the upper bar and the lower bar are fixed together.

4. A fishing lure as claimed in any claim 1, wherein the bill has a substantially circular shape, truncated at a chord.

5. A fishing lure as claimed in claim 1, wherein the bill is disposed at substantially 90 degrees to the support rod and at substantially 60 degrees to the lower bar to ensure that in use a bait fish mounted on the fishing lure is disposed in a stable and upright position.

6. A fishing lure as claimed in claim 1, where the support rod, the upper bar and the lower bar are fixed together in an intersection region to form the mounting body.

7. A fishing lure as claimed in claim 6, wherein the mounting body is moulded as a unitary metal component.

8. A fishing lure as claimed in claim 7, wherein the mounting body is substantially made of brass.

9. A fishing lure as claimed in claim 1, wherein the upper bar has one or more eyelets for attaching a fishing line thereto.

10. A fishing lure as claimed in claim 1, wherein the support rod provides 45-50% of the weight of the fishing lure.

11. A fishing lure as claimed in claim 1, wherein the lower bar provides 15-20% of the weight of the fishing lure.

12. A fishing lure as claimed in claim 1, the fishing lure further comprising a line and a hook, wherein the line is attached to the lower bar, whereby the hook is adapted to be hooked on to a bait fish.

13. A fishing lure as claimed in claim 1, wherein the support rod is adapted to extend beyond the upper bar and the lower bar along a length of the mounted bait fish.

14. A fishing lure as claimed in claim 1, wherein an angle between the first surface and the support rod is substantially equal to an angle between the support rod and the second surface.

15. A fishing lure as claimed in claim 1, wherein a depth of the recess is substantially half a width of the support rod.

16. A fishing lure as claimed in claim 1, wherein the fixing hook comprises a locking pin rotatably mounted on the fishing lure wherein the locking pin is adapted to penetrate the skull of a bait fish.

17. A fishing lure as claimed in claim 16, wherein the upper bar or the lower bar is provided with an aperture, and wherein the locking pin is adapted to pass through the aperture when fixing a bait fish to the mounting body.

18. A method of preparing a bait fish for trolling using a fishing lure comprising a mounting body having a weighted support rod with a recess, an upper bar, a weighted lower bar acting as a counterweight to the weighted support rod and a bill, comprising:
   inserting the support rod into the mouth of a bait fish and pushing the support rod into the bait fish until a head of the bait fish abuts a first surface of the upper bar and a second surface of the lower bar and a jaw of a bait fish closes over the recess, fixing the bait fish to the mounting body with a fixing hook, and trolling the fishing lure with the fish supported by the support rod counterbalanced by the lower bar with a reciprocating lateral motion induced by the bill, wherein the bill and the lower bar are fixed together.

* * * * *